United States Patent
Kempf et al.

(10) Patent No.: US 7,754,280 B2
(45) Date of Patent: Jul. 13, 2010

(54) SILVER/CARBON-BASED MATERIAL AND METHOD FOR PRODUCING THE SAME FOR CONTACT MATERIAL

(75) Inventors: Bernd Kempf, Kleinwallstadt (DE); Roger Wolmer, Hanau-Grossauheim (DE); Carsten Boehme, Karben (DE); Werner Roth, Hasselroth (DE); Andreas Koffler, Niederau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 147 days.

(21) Appl. No.: 12/063,587

(22) PCT Filed: Aug. 10, 2006

(86) PCT No.: PCT/EP2006/007915

§ 371 (c)(1),
(2), (4) Date: Feb. 12, 2008

(87) PCT Pub. No.: WO2007/020007

PCT Pub. Date: Feb. 22, 2007

(65) Prior Publication Data

US 2008/0241543 A1    Oct. 2, 2008

(30) Foreign Application Priority Data

Aug. 12, 2005   (DE) ................... 10 2005 038 233

(51) Int. Cl.
*B01J 13/22* (2006.01)
*C22B 1/16* (2006.01)

(52) U.S. Cl. .................... 427/213.31; 427/217; 75/751; 75/765

(58) Field of Classification Search ............ 427/213.31, 427/217; 75/751, 765
See application file for complete search history.

(56) References Cited

U.S. PATENT DOCUMENTS

| | | | |
|---|---|---|---|
| 2,729,559 A | | 1/1956 | Matsukawa |
| 4,240,830 A | * | 12/1980 | Lee ............................ 419/28 |
| 4,353,741 A | * | 10/1982 | Capuano et al. ............. 549/534 |
| 4,361,500 A | * | 11/1982 | Mathe et al. ................. 502/167 |
| 5,051,307 A | * | 9/1991 | Divecha et al. ............. 428/408 |
| 5,798,468 A | * | 8/1998 | Weise et al. .................... 75/232 |
| 5,808,213 A | * | 9/1998 | Weise et al. .................... 75/247 |
| 5,945,158 A | * | 8/1999 | Djokic et al. ................ 427/216 |
| 6,409,794 B2 | * | 6/2002 | Wolmer et al. ................. 75/232 |
| 7,138,159 B2 | * | 11/2006 | Hampden-Smith et al. ....... 427/376.1 |
| 7,566,437 B2 | * | 7/2009 | Goia et al. ................... 423/604 |

FOREIGN PATENT DOCUMENTS

DE        100 17 282 A1   10/2001

OTHER PUBLICATIONS

International Search Report (PCT/EP2006/007915), Jun. 12, 2006.

* cited by examiner

*Primary Examiner*—H. (Holly) T Le
(74) *Attorney, Agent, or Firm*—Kalow & Springut LLP; William D. Schmidt

(57) ABSTRACT

The invention relates to a process for producing a material based on silver-carbon, that involves the steps of: (i) providing a suspension of carbon particles; and (ii) supplying a solution of a silver compound and of a reducing agent, such that a silver-containing precipitate is deposited onto the carbon particles, where the carbon particles have a mean diameter of 200 nm or greater. The invention further relates to a material obtainable by this process and to the use of the material in circuit breakers for low-voltage power engineering.

17 Claims, 1 Drawing Sheet

SILVER/CARBON-BASED MATERIAL AND METHOD FOR PRODUCING THE SAME FOR CONTACT MATERIAL

FIELD OF THE INVENTION

Background of the Invention

The present invention relates to a process for preparing a material based on silver-carbon and a material obtainable therefrom. The use of the material is likewise described.

Materials for electrical contacts in power engineering consist generally of silver and particular metallic and/or nonmetallic or oxidic additives. Such materials are produced predominantly by a powder metallurgy route. In this method, the components are mixed with one another in powder form.

The application profile of such contact materials is determined crucially by the switching device type, the magnitude of the switching current and the type of electrical load. The operating conditions require low electrical wear, i.e. high arc erosion resistance, and low welding force with simultaneously low contact resistance.

Contact materials based on silver-carbon, especially silver-graphite, have found use particularly in the sector of circuit breakers in low-voltage power engineering. The crucial factor here is especially ultra-high reliability with respect to the welding of the contact pieces.

Improvement in the processing and contact properties of these materials is the constant motivation for further material and technology developments. At the forefront is the optimization of the two switch properties of arc erosion resistance and welding resistance. These are actually opposing with regard to the carbon content. In other words, with increasing carbon content, protection against welding generally becomes better, but the arc erosion resistance decreases (E. Vinaricky "Elektrische Kontakte, Werkstoffe und Anwendungen" [Electrical contacts, materials and applications]; 2nd edition, Springer Verlag; 2002; p. 251-255).

The addition of carbon also brings about mechanical strengthening of the material, such that the producibility and processibility of the material becomes more difficult with rising carbon content. This effect occurs especially when a powder metallurgy mixture of the two components is to be compacted and reshaped by extrusion. At carbon contents of more than about 5%, the material can be extruded only with very great difficulty.

EP-A-311 134 discloses a material produced by powder metallurgy for electrical contacts composed of silver with from 2 to 7% by weight of graphite and a specific additive which enhances the strength of the material.

EP-A-736 885 describes a material for electrical contacts composed of silver-carbon, which has improved arc erosion properties. This material comprises carbon exclusively in the form of carbon black with a mean primary particle size of less than 150 nanometers. The material is produced by cold isostatic pressing and sintering.

WO 92/18995 relates to a particular composite material for electrical contacts. The composite material is based on silver and contains from 0.5 to 10% by weight of carbon, carbon powder being processed in combination with carbon fibers in a mass ratio of from 10:1 to 1:10 together with the silver component by powder metallurgy to give a material. On average, the length of the carbon fibers is more than double the diameter of the carbon powder particles.

A further composite material for electrical contacts is disclosed in EP-A-729 162. It is produced using carbon fibers which have been subjected to a specific comminution process.

In the above-described publications, the material was produced by powder metallurgy. In the Chinese patent CN-A-1396025, a chemical reduction process for producing silver-graphite material is presented. In this process, graphite nanopowder having a size of about 20 nm is used. The graphite powder is introduced into a reaction vessel and mixed with silver nitrate solution. Subsequently, hydrazine hydrate solution is added, such that a silver layer is deposited onto the graphite nanopowder. The graphite nanopowder coated with a silver layer is subsequently processed further by means of individual pressing and sintering. This process has the disadvantage that the hydrazine hydrate used is hazardous to health and is consequently undesirable for industrial scale application. The present inventors have additionally found that the material obtained by this process is not sufficiently finely dispersed and homogeneous. Furthermore, the material has excessively high strengthening, such that processing by extrusion is possible only under costly conditions, if at all. The processing by individual pressing proposed in CN-A-1396025 is usually comparatively undesirable on the industrial scale from an economic point of view.

DE-A-100 17 282 describes a particular two-nozzle precipitation process for producing composite powder. The composite powders are, unlike the inventive materials, not materials based on silver-carbon but rather materials based on silver-tin oxide. Silver-tin oxide contact materials and, more generally, silver-oxide contact materials are used mainly for contactors which switch under air for low-voltage and high-voltage engineering. The main objective of their function is to ensure very many switching cycles, for example for an engine control system. The material and switching device are such that several tens of thousands (AC4 switching response) to millions of switching cycles (AC3 or AC1 switching response) are possible according to the switching conditions. Accordingly, these materials must have good arc erosion behavior and acceptable reliability with respect to welding.

Materials based on silver-carbon, in contrast, are used very predominantly in circuit breakers (for example line circuit breakers, engine circuit breakers, power switches) in low-voltage power engineering. The switches serve here for the safety of people and equipment. In the case of failure, for example a short circuit, ultra-high requirements are made here on welding reliability, i.e. they must never become welded. Since the switches should be triggered only in the case of emergency, a significantly lower number of switching operations is accepted here. According to the switching condition, this may only be a few dozen, or a few hundred up to a maximum of a few thousand switching cycles. Frequently, asymmetric material pairs are used in order to take account of peculiarities in construction and economic aspects. These are material pairs such as AgC with Cu, AgW, Ag-metal oxide or AgNi. There is therefore no comparability with silver-tin oxide materials.

SUMMARY OF THE INVENTION

It was an object of the present invention to provide materials based on silver-carbon, which have improved welding resistance, arc erosion resistance and/or processibility.

Accordingly, the invention relates to a process for producing a material based on silver-carbon, comprising the steps of:
(i) providing a suspension of carbon particles; and
(ii) supplying a solution of a silver compound and of a reducing agent, such that a silver-containing precipitate is deposited onto the carbon particles, where the carbon particles have a mean diameter of 200 nm or greater.

The invention further relates to a material obtainable by this process, and to the use of the material in circuit breakers for low-voltage power engineering.

DETAILED DESCRIPTION OF THE PREFERRED EMBODIMENTS

Figure 1:
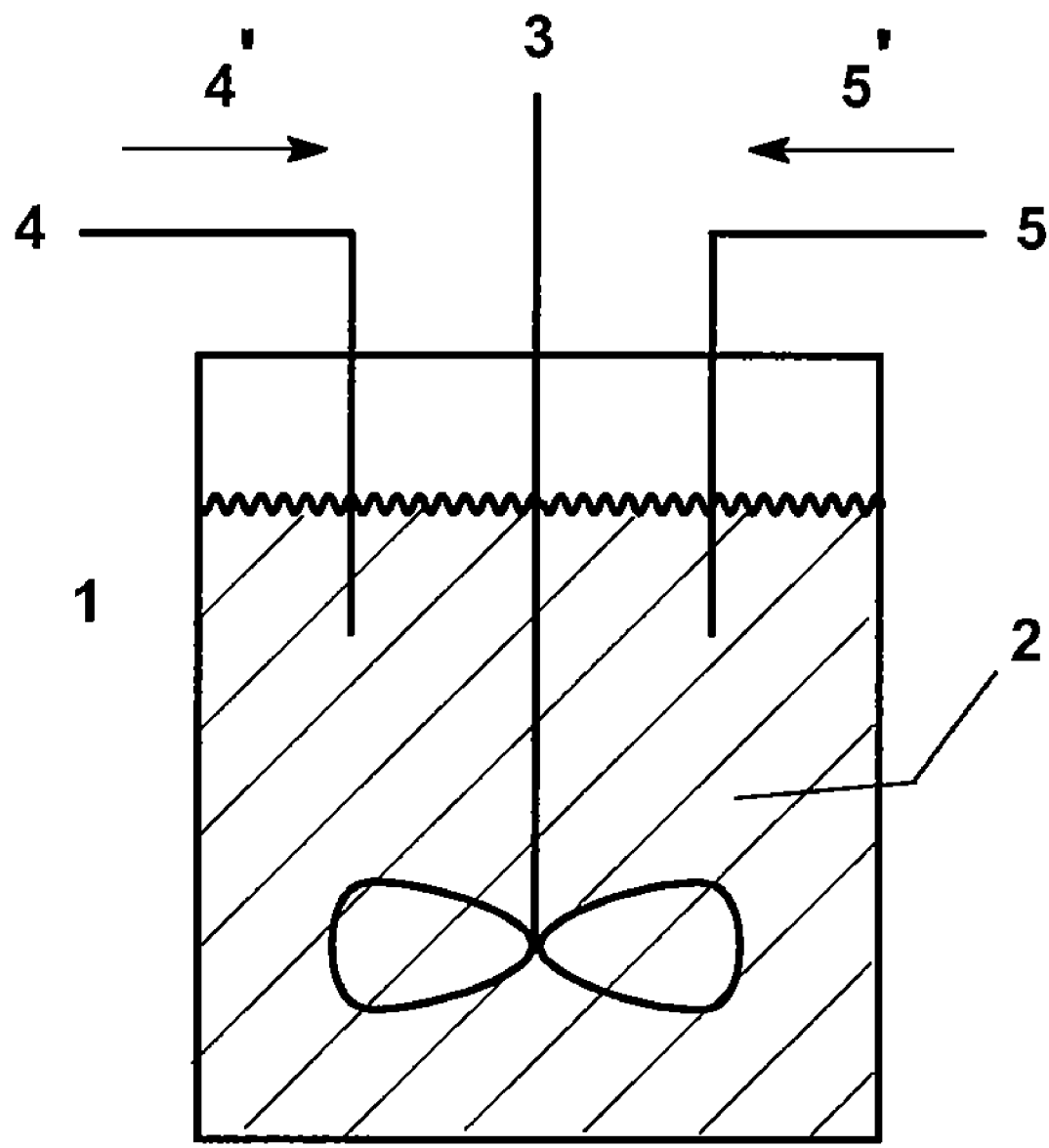
FIG. 1 shows a schematic illustration of an apparatus which can be used in a preferred embodiment of the process according to the invention.

FIG. 1 shows a schematic illustration of an apparatus which can be used in a preferred embodiment of the process according to the invention.

A reaction vessel (1) is initially charged with a suspension of carbon particles (2). These are mixed intensively by a stirrer (3). By means of two separate feed lines (4; 5), whose nozzles are below the liquid level of the suspension (2), one solution in each case of the silver compound (4') and reducing agent (5') are fed to it simultaneously, as a result of which silver-containing precipitate is deposited onto the suspended carbon particles.

In the process according to the invention, a suspension of carbon particles is initially provided. The carbon particles are not particularly restricted. It is possible to use all carbon particles which are typically used in materials based on silver-carbon. They are preferably selected from graphite powder, carbon fibers and carbon black, and also combinations thereof, particular preference being given to graphite powder and carbon fibers. The carbon fibers preferably have a mean diameter of from 500 to 15 000 nm, more preferably from 2000 nm to 7000 nm.

The carbon particles can, for example, be divided into spherical and fibrous carbon particles. Spherical carbon particles, for instance graphite powder and carbon black, generally have an essentially spherical shape. In this context, "spherical" means that the particles have essentially equal longitudinal dimensions in all three spatial directions. The mean diameter of the spherical carbon particles is 200 nm or greater. In contrast to these are fibrous carbon particles such as carbon fibers. Fibrous carbon particles are defined here as particles which, in one spatial direction, have a longer dimension than in the other two spatial directions. Typically, the fiber length, relative to the fiber diameter, has a ratio of at least 2:1, preferably at least 5:1. The maximum fiber length is, for example, 20:1 in relation to the fiber diameter. The mean diameter (fiber diameter) of the fibrous carbon particles is 200 nm or greater. Typical fibrous carbon particles have a diameter of from 0.5 to 30 μm, preferably from 1 to 20 μm, particularly preferably from 3 to 10 μm and have corresponding fiber lengths in each case.

In one embodiment, the carbon particles are a mixture of graphite powder and/or carbon black:carbon fibers in a ratio of from 20:1 to 1:20. The mixture consists preferably of from 100% by weight to 98% by weight of graphite powder and from 0% by weight to 2% by weight of carbon black (based on the total weight of graphite and carbon black) in combination with carbon fibers. This is advantageous when the arc erosion resistance and welding resistance are to be balanced with respect to one another for a specific switching device. In another embodiment, only graphite powder is used as carbon particles. This is of interest when an optimal welding reliability is to be achieved. In a third embodiment, only carbon fibers are used as carbon particles. This allows the arc erosion resistance to be enhanced.

The carbon particles are suspended in a liquid. The type of liquid is not particularly restricted. However, it should react neither with the carbon particles, nor the silver compound, nor the reducing agent, nor the silver-containing precipitate. Examples of suitable liquids are water, suitable organic solvents (e.g. alcohols) and combinations thereof. In addition, it is possible to use wetting aids, for example surfactants, in order to facilitate the suspension of the carbon particles. Preference is given to using water.

The concentration of the carbon particles in the suspension is likewise not particularly restricted. It is generally selected such that the suspension has a suitable viscosity and the subsequent reduction proceeds advantageously. Too high a liquid content should, however, be avoided, since the liquid has to be removed again. The optimal concentration can be selected in a suitable manner without any problem by the person skilled in the art. It is preferably in the range from 0.1 to 25% by weight of carbon particles in the suspension.

In order to deposit a silver-containing precipitate onto the carbon particles, a solution of a silver compound and a reducing agent is added to the suspension of carbon particles. The solution of the silver compound can be added to the suspension of carbon particles before, after or simultaneously with the reducing agent. A preferred addition process is described in DE-A-100 17 282. The process described relates to the chemical reductive precipitation of silver-containing precipitate onto tin oxide particles. However, it can be used analogously for the chemical reductive precipitation of silver-containing precipitate onto carbon particles.

The silver compound used is not particularly restricted and may, for example, be any soluble silver salt. Examples thereof are nitrates, acetates, carbonates, citrates and oxalates. Preference is given to using nitrates. The silver compound used is preferably dissolved in water or a suitable organic solvent (e.g. alcohol). In general, water is used as the solvent.

The silver-containing precipitate is preferably metallic silver.

Useful reducing agents are all compounds which can reduce the silver compound. Typical examples are ascorbic acid, citric acid, oxalic acid, formic acid and hydroxylamine. The reducing agent may likewise be dissolved in water or a suitable organic solvent (e.g. alcohol) and be supplied in dissolved form.

In order to achieve the uniform precipitation of silver-containing precipitate onto the carbon particles, the silver compound and the reducing agent are appropriately added continuously over the course of the reduction, simultaneously but with separate supply and in stoichiometrically equivalent amounts. Intensive mixing is likewise advantageous during the reduction. The supply is effected advantageously below the liquid surface.

The proportions of silver compound and carbon particles are guided by the end use of the material and can be selected suitably by the person skilled in the art. Advantageously, the material contains from 0.5 to 12% by weight, preferably from 1 to 12% by weight, more preferably from 2 to 10% by weight, even more preferably from 2 to 8% by weight, of carbon. The material may contain further components or impurities in an amount of up to 1% by weight. The remaining fractions in the material are silver.

The process according to the invention allows the preparation of materials based on silver-carbon. It is possible by the process according to the invention to achieve more homogeneous distribution of the carbon particles than in customary powder metallurgy mixing processes. This is particularly advantageous in the case of fibrous or very fine particles which are difficult to mix. In addition, a higher ductility is achieved, such that processibility is facilitated, for example in the extrusion and in the subsequent shaping. A further advantage is that higher fill levels can be achieved with the process according to the invention compared to processes which are based on mixing by powder metallurgy means. Consequently, a saving of the noble metal silver is possible. Moreover, a better switching response in circuit breakers is observed, compared to materials which are produced by means of mixing by powder metallurgy means.

The carbon particles coated with the silver-containing precipitate can subsequently be separated from the solvent, optionally dried and then processed further. Although individual sintering is possible, it is not preferred for economic reasons. In a preferred embodiment, the coated carbon particles, under cold isostatic conditions, are pressed, sintered and extruded. However, it is possible to employ any other known processes for further processing.

Typical conditions for the cold isostatic pressing are from 60 to 90 MPa. The sintering is typically performed at from 800 to 900° C. under protective gas such as $N_2/H_2$ (50:50). Subsequently, extrusion is performed. To this end, bolts are preheated, for example, to from 750 to 850° C. before the pressing by means of induction heating, and then introducing directly into the preheated recipients (for example from 400 to 500° C.) and pressed out in the defined form through the selected die.

The materials produced by the process according to the invention are notable for a particularly homogeneous and dispersed distribution. In addition, they surprisingly have excellent welding resistance with equal or possibly better arc erosion resistance and good processing performance even at relatively high carbon contents.

The resulting materials based on silver-carbon can be used in all fields of use in which materials based on silver-carbon have been used to date. However, they are particularly suitable for circuit breakers in low-voltage power engineering.

EXAMPLES

The examples which follow are intended to illustrate the invention. However, they should not be regarded as a restriction. Instead, the scope of protection is determined by the claims.

The following abbreviations are used:

IS individual sintering

WCP wet-chemical precipitation

EX extrusion

Example 1

Material A is produced as a comparison by means of extrusion 19 kg of silver spray powder having a particle diameter of less than 63 μm were mixed in dry form with 1 kg of graphite powder ($d_{50}$ 4.4 μm). The mixture was subsequently pressed to bolts under cold isostatic conditions with a pressure of 60 MPa, sintered under $H_2/N_2$ (50:50) protective gas and, after inductive preheating of the bolt to 780° C., extruded. The switch samples were machined from the extruded wires such that the switch surface was at right angles to the direction of extrusion. The graphite particle agglomerates pulled apart in fibrous form by the extrusion were thus at right angles to the switch surface. In the case of agglomerates, the mean diameter is based essentially on the mean diameter of the particles of which the agglomerates are composed. To obtain a solderable and weldable layer, the particles were fired under air at 520° C. for approx. 15 min and then sawn through, such that an unfired switch surface was available.

Example 2

The inventive materials B, C, D, E and I were produced by chemical reductive precipitation and extrusion.

Material B

To produce a 1.5 kg batch of a composite powder with a 5% by weight carbon content, 2244 g of silver nitrate, 75 g of graphite particles ($d_{50}$=4.4 μm) and 1186.6 g of ascorbic acid were used. The graphite particles were suspended in distilled water with the aid of a disperser and then transferred to a reaction vessel. The silver nitrate was made up as a 3.5 molar solution and the ascorbic acid as a 1.7 molar solution. By means of simultaneous and equal addition of stoichiometric amounts through two separate feeds as shown schematically in FIG. 1, and with simultaneous intensive mixing by means of a high-energy stirring system, metallic silver was precipitated onto the graphite particles at a constant rate of approx. 130 g/min. The coated graphite particles thus produced were separated from the liquid by means of a suction filter, washed, dried and prescreened to 250 μm. The further processing was effected as in example 1 by means of extrusion.

The sampling of the switch samples was again also effected such that the switch surface was at right angles to the direction of extrusion. Owing to the actually individually embedded particles, though, the structure here was so homogeneous that fibrous alignment of the graphite particles was virtually indiscernible.

Materials C, D and E

Materials C, D and E were produced like material B, with the difference that other carbon contents or carbon types were used. Material C contained 6% by weight of graphite particles, material D contained 4% by weight of graphite particles and 2% by weight of carbon fibers, and material E contained 7% by weight of graphite particles.

Material I

Material I was produced like material B, with the difference that the switch surface was aligned parallel to the direction of extrusion in the sampling of the switch samples.

Example 3

Material F was produced by means of individual sintering as a comparison.

2 kg of silver spray powder having a particle diameter of less than 63 μm were mixed in dry form with 100 g of graphite powder ($d_{50}$=4.4 μm). The mixture was subsequently sintered individually. To this end, the powder mixture was filled into corresponding press molds, pressed (approx. 200 MPa) and sintered under a protective gas atmosphere (sintering temperature: 880° C.; t=3 h, atmosphere: 80/20 $N_2/H_2$; then calibration pressing at approx. 800 MPa). To obtain a solderable and weldable layer, a pure silver layer of approx. 10% of the total amount of sample was first introduced here into the press mold. Subsequently, the powder mixture was added.

Example 4

The inventive materials G and H were produced by chemical reductive precipitation and individual sintering.

Material G

To produce a 1.5 kg batch of a composite powder with a 5% by weight carbon content, 2244 g of silver nitrate, 75 g of graphite particles ($d_{50}$=4.4 μm) and 1186.6 g of ascorbic acid were used. The graphite particles were suspended in distilled water with the aid of a disperser and then transferred to a reaction vessel. The silver nitrate was made up as a 3.5 molar solution and the ascorbic acid as a 1.7 molar solution. By means of simultaneous and equal addition of stoichiometric amounts through two separate feeds as shown schematically in FIG. 1 and with simultaneous intensive mixing by means of a high-energy stirring system, metallic silver was deposited onto the graphite particles at a constant rate of approx. 130 g/min. The coated graphite particles thus produced were separated from the liquid by means of a suction filter, washed, dried and prescreened to 250 μm. The further processing was effected as in example 3 by means of individual sintering technology.

Material H

Material H was produced like material G, with the difference that 6% by weight of graphite particles were used.

Test Methods

Determination of the Mean Particle Diameter

The diameter of the spheres is defined as the particle diameter in the case of essentially spherical particles. In the case of nonspherical particles, the shortest diameter is defined as the particle diameter. For example, in the case of fibrous particles, the diameter of the fibers is defined as the particle diameter. To determine the mean particle diameter, the particle diameter of at least 25 particles is determined, for example, by means of microscopy. Subsequently, the mean is calculated.

Switching Response

The switching response of the materials was studied both in a switch-on model switch and in a switch-off model switch.

The switch-on model switch and switch-off model switch corresponded to the test apparatus described in "Über den Einfluss des Herstellverfahrens auf das Schaltverhalten von Kontaktwerkstoffen der Energietechnik" [The influence of the production process on the switching response of contact materials in power transmission], Poniatowski, Schroder, Schulz; 7th Int. conference on electrical contacts, Paris 1974.

Welding Force

To measure the welding force in the switching-on operation, the apparatus was equipped with a pressure measurement cell which enabled the force to be measured (referred to as the welding force) which has to be applied in the currentless separation of a weld.

Specific Arc Erosion

The specific arc erosion is determined in each case by weighing, by measuring the mass loss of the contact pieces after a particular number of switching operations and dividing it by the electric arc energy likewise determined.

Specific Switching Conditions

Switch-on test: Test current=700 A, 230 V, alternating current
    300 switching operations
    Measurement of the welding force by means of a pressure measurement cell, specification of the 95% value, i.e. 95% of the welding forces measured are below the value specified
    Alignment of the elongated carbon particles always at right angles to the direction of extrusion and hence to the switch surface; only material I was aligned in parallel.

In the case of individually sintered material, the switch surface is always at right angles to the direction of uniaxial pressing.

Switch-off test: Test current=1300 A; 230V, alternating current, magnetic blowout field 30 mT/kA
    150 switching operations
    Alignment of the elongated carbon particles always at right angles to the direction of extrusion and hence to the switch surface; only material I was aligned in parallel.

In the case of individually sintered material, the switch surface is always at right angles to the direction of uniaxial pressing.

Example 5

In this example, the welding behavior of the materials produced by extrusion or individual sintering was tested in the switch-on model switch.

TABLE 1

Welding force in the switch-on model switch, sample production by extrusion

| Material | Welding force [N] |
|---|---|
| A1 (5% graphite, comparison, EX) | 4.4 |
| A2 (5% graphite, comparison, EX) | 5.0 |
| B1 (5% graphite, WCP EX) | 1.8 |
| B2 (5% graphite, WCP EX) | 2.2 |
| C1 (6% graphite, WCP EX) | 0.7 |
| C2 (6% graphite, WCP EX) | 1.1 |
| D1 (4% graphite + 2% fiber, WCP EX) | 2.9 |
| D2 (4% graphite + 2% fiber, WCP EX) | 3.2 |
| E1 (7% graphite, WCP EX) | 0.4 |
| E2 (7% graphite, WCP EX) | 0.6 |
| I1 (5% graphite, WCP EX, C parallel) | 0.8 |
| I2 (5% graphite, WCP EX, C parallel) | 0.6 |

In the case of equal graphite contents, about a halving of the welding force compared to comparative material A1 and A2 is observed (compare samples A1 and A2 with samples B1 and B2). The process according to the invention additionally enables higher graphite contents than 5% also to be established, since the homogeneous embedding of the carbon particles into the silver matrix still allows sufficiently good processing properties to be realized. In the case of comparative material A1 and A2 in contrast, generally no graphite contents significantly higher than approx. 5% should be used, since the processing complexity which is then higher cannot be justified by correspondingly better switch properties.

In contrast, the inventive materials can also be processed efficiently with graphite contents of 6 and 7% by weight. When the graphite content is increased, the welding force falls further once again, but the arc erosion surprisingly remains at about the same level, while the technical literature reports an increase in arc erosion with rising carbon content (see Vinaricky; see table 1). The process according to the invention also allows a portion of the graphite to be replaced by carbon fibers. The welding forces are lowered somewhat compared to the comparative material, without the arc erosion rising in the case of elevated carbon content (cf. table 1 & table 3). It is therefore possible here too to establish higher carbon contents and hence to save silver. It is also of particular interest that an inventive material provides positive switching results when the switch surface is aligned parallel to the direction of extrusion. In the technical literature (Vinaricky, page 252), in the case of such an alignment, about a doubling in arc erosion is observed compared to alignment at right angles. Such a material has the great advantage that switch pieces can be produced with significantly higher yield from the extrudate owing to the different alignment than when the switch pieces have to be produced with alignment at right angles to the direction of extrusion. This is economically advantageous.

TABLE 2

Welding force in the switch-on model switch, sample production by means of individual sintering

| Material | Welding force [N] |
| --- | --- |
| F1 (5% graphite, comparison, IS) | 0.7 |
| F2 (5% graphite, comparison, IS) | 0.4 |
| G1 (5% graphite, WCP IS) | 0.5 |
| G2 (5% graphite, WCP IS) | 0.3 |
| H1 (6% graphite, WCP IS) | 0.4 |
| H2 (6% graphite, WCP IS) | 0.2 |

In the case of individually sintered materials, the welding forces are generally very low, such that no significant differences are noticeable here. The advantages of the process according to the invention lie here in the comparatively better arc erosion behavior (see table 4).

Example 6

In this example, the arc erosion behavior of the materials produced by extrusion or individual sintering was tested in the switch-on model switch.

TABLE 3

Specific arc erosion in the switch-on model switch; sample production via extrusion

| Material | Spec. arc erosion [μg/Ws] |
| --- | --- |
| A1 (5% graphite, comparison, EX) | 15.6 |
| A2 (5% graphite, comparison, EX) | 16.3 |
| B1 (5% graphite, WCP EX) | 14.0 |
| B2 (5% graphite, WCP EX) | 15.5 |
| C1 (6% graphite, WCP EX) | 14.2 |
| C2 (6% graphite, WCP EX) | 14.3 |
| D1 (4% graphite + 2% fiber, WCP EX) | 18.2 |
| D2 (4% graphite + 2% fiber, WCP EX) | 16.6 |
| E1 (7% graphite, WCP EX) | 17.2 |
| E2 (7% graphite, WCP EX) | 18.1 |
| I1 (5% graphite, WCP EX, C parallel) | 16.9 |
| I2 (5% graphite, WCP EX, C parallel) | 18.7 |

The arc erosion resistance is no better than for the comparative material at the same carbon content, but this arc erosion resistance is maintained even at higher carbon contents, while it has been reported in the prior art that it otherwise generally decreases with rising carbon content (see Vinaricky). In other words, it is possible to utilize the better welding resistance of the materials with higher carbon contents without the arc erosion behavior becoming significantly poorer as a result. There is an additional economic advantage through saving of silver. As a further positive aspect, the still good processibility should be mentioned, even in the case of material I with parallel alignment.

TABLE 4

Specific arc erosion in the switch-on model switch; sample production via individual sintering

| Material | Spec. arc erosion [μg/Ws] |
| --- | --- |
| A1 (5% graphite, comparison, IS) | 45.8 |
| A2 (5% graphite, comparison, IS) | 43.0 |
| B1 (5% graphite, WCP IS) | 33.1 |
| B2 (5% graphite, WCP IS) | 34.6 |

The individually sintered material exhibits generally poorer arc erosion behavior than the extruded material. However, the values in table 4 show that the worsening in this property in the inventive materials does not assume such serious proportions as in the comparative material.

Example 7

In this example, the arc erosion behavior in the switch-on model switch is tested.

TABLE 5

Specific arc erosion in the switch-off model switch; sample production via extrusion

| Material | Spec. arc erosion [μg/Ws] |
| --- | --- |
| A1 (5% graphite, comparison, EX) | 18.9 |
| A2 (5% graphite, comparison, EX) | 19.6 |
| B1 (5% graphite, WCP EX) | 16.1 |
| B2 (5% graphite, WCP EX) | 17.2 |
| C1 (6% graphite, WCP EX) | 15.7 |
| C2 (6% graphite, WCP EX) | 15.0 |
| D1 (4% graphite + 2% fiber, WCP EX) | 14.3 |
| D2 (4% graphite + 2% fiber, WCP EX) | 13.5 |
| E1 (7% graphite, WCP EX) | 12.3 |
| E2 (7% graphite, WCP EX) | 13.2 |

In the switch-off model switch, a comparable picture is found to that in the case of the switch-on model switch. Here too, the arc erosion resistance is maintained up to higher carbon contents or even improves somewhat (see table 5).

TABLE 6

Specific arc erosion in the switch-off model switch; sample production via individual sintering

| Material | Spec. arc erosion [μg/Ws] |
| --- | --- |
| A1 (5% graphite, comparison, IS) | 26.2 |
| A2 (5% graphite, comparison, IS) | 26.0 |
| B1 (5% graphite, WCP IS) | 18.4 |
| B2 (5% graphite, WCP IS) | 17.2 |
| C1 (6% graphite, WCP IS) | 20.1 |
| C2 (6% graphite, WCP IS) | 18.2 |

The results of the individually sintered samples in the switch-off tests correspond again to the trends in the switch-on tests. The inventive material is better than the comparative material. This advantage is maintained even at 6% by weight of carbon.

What is claimed is:

1. A process for producing a contact material based on silver-carbon, comprising the steps of:
   (i) providing a suspension of carbon particles;
   (ii) supplying a solution of a silver compound and of a reducing agent, such that a silver-containing precipitate is deposited onto the carbon particles, where the carbon particles have a mean diameter of 200 nm or greater, and
   (iii) either (a) pressing the coated carbon particles obtained in step (ii) under cold isostatic conditions and then sintering and extruding the coated carbon particles; or (b) individually sintering the coated carbon particles.

2. The process as claimed in claim 1, wherein the solution of the silver compound and the reducing agent are added continuously over the course of the reaction with mixing, with simultaneous but separate supply and in stoichiometrically equivalent amounts.

3. The process as claimed in claim 1, wherein the silver compound is a silver salt which is selected from the group of silver nitrate, silver acetate, silver carbonate, silver citrate and silver oxalate.

4. The process as claimed in claim 1, wherein the reducing agent is selected from the group of ascorbic acid, citric acid, oxalic acid, formic acid and hydroxylamine.

5. Process according to claim 1, wherein the carbon particles are selected from graphite powder, carbon fibers and carbon black, and combinations thereof.

6. The process as claimed in claim 5, wherein the carbon particles are a mixture of graphite powder and/or carbon black: carbon fibers in a ratio of from 20:1 to 1:20.

7. The process as claimed in claim 5, wherein the carbon particles are from 100% by weight to 98% by weight of graphite powder and from 0% by weight to 2% by weight of carbon black (based on the total weight of graphite powder and carbon black) in combination with carbon fibers.

8. The process as claimed in claim 5, wherein the carbon particles are carbon fibers.

9. The process as claimed in claim 8, wherein the carbon fibers have a diameter of from 0.5 µm to 30 µm and the length is at least twice as great as the diameter.

10. The process as claimed in claim 1, wherein the mean particle diameter of the carbon particles is from 0.2 µm to 15 µm.

11. The process as claimed in claim 1, wherein the proportions of silver compound, carbon particles and further components are selected such that from 0.5 to 10% by weight of carbon, from 0 to 1% by weight of further components, remainder silver are present in the material.

12. The process as claimed in claim 1, wherein the sintering is performed at from 800 to 900° C.

13. The process as claimed in claim 1, wherein the sintering is performed under protective gas.

14. The process for producing the contact material as claimed in claim 1, wherein the contact material consists of from 0.5 to 10% by weight of carbon, from 0 to 1% by weight of further components, remainder silver.

15. The process for producing the contact material as claimed in claim 14, wherein the contact material contains from 2 to 8% by weight of carbon.

16. The process as claimed in claim 1, wherein the cold isostatic conditions comprise cold isostatic pressing with a pressure of 60 to 90 MPa.

17. A method of using a contact material for low-voltage power engineering, the method comprising: (i) providing the contact material produced by the process of claim 16; (ii) inserting the contact material into a circuit breaker; and (iii) providing a low-voltage power to the circuit breaker.

* * * * *